United States Patent [19]

Pearce et al.

[11] Patent Number: 5,028,499
[45] Date of Patent: Jul. 2, 1991

[54] CHARGE BALANCING OF RECHARGEABLE BATTERIES

[75] Inventors: Leonard J. Pearce; Graham Hazzard, both of Bournemouth, England

[73] Assignee: The Secretary of State for Defence in Her Britannic Majesty's Government of the United Kingdom of Great Britain and Northern Ireland, London, England

[21] Appl. No.: 474,076

[22] PCT Filed: Oct. 13, 1988

[86] PCT No.: PCT/GB88/00827
§ 371 Date: May 1, 1990
§ 102(e) Date: May 1, 1990

[87] PCT Pub. No.: WO89/03599
PCT Pub. Date: Apr. 20, 1989

[30] Foreign Application Priority Data

Oct. 15, 1987 [GB] United Kingdom ............... 8724189

[51] Int. Cl.$^5$ ............................................ H01M 10/48
[52] U.S. Cl. ........................................ 429/61; 429/91
[58] Field of Search .................... 429/61, 90, 91, 92, 429/93

[56] References Cited

FOREIGN PATENT DOCUMENTS

A3 0055888 7/1982 European Pat. Off.
A 3326729 2/1985 Fed. Rep. of Germany.
A 1536494 7/1968 France.

OTHER PUBLICATIONS

Patent Abstracts of Japan, vol. 5, No. 99 (E-63)(771), Jun. 26, 1981, JP, A 5642971 (Tokyo Shibaura Denki K.K.) Apr. 21, 1981.
Patent Abstracts of Japan, vol. 10, No. 129 (E-403)(2186), May 14, 1986, JP, A 60258870 (Matsushita Denki Sangyo K.K.) Dec. 20, 1985, International Search Report.

*Primary Examiner*—Anthony Skapars
*Attorney, Agent, or Firm*—Nixon & Vanderhye

[57] ABSTRACT

The invention relates to charge balancing of cells of rechargeable batteries. The battery comprises means to balance the distribution of hydrogen between all of the cells and means to remove the hydrogen from the cells. The battery further includes means to monitor the charge of each cell to detect if the charge of a cell becomes out of balance with the other cells. Hydrogen is added to the cells when the charges are out of balance to obtain self-discharge.

6 Claims, 1 Drawing Sheet

CHARGE BALANCING OF RECHARGEABLE BATTERIES

The invention relates to charge balancing of cells of rechargeable batteries principally but not exclusively having a negative electrode composed at least partly of an alkali or alkaline earth metal, for example lithium.

The process by which cells in a rechargeable battery are brought to a state where each contains the same amount of electrical charge is known as charge balancing. If a number of cells in a battery are connected electrically in series it is of crucial importance that each cell can be fully charged otherwise the performance of the whole string of cells is limited by the cell that contains the least electrical charge, i.e. the weakest link. If one cell becomes out of balance with respect to the others then the efficiency of the battery is reduced. A battery deteriorates far more rapidly if the charges on the cells are out of balance than if they are balanced, because it is likely that gross overcharging or discharging will occur during the discharge/recharge cycle and this can catastrophically damage cells in many types of cell systems. One approach to recharging a battery is to monitor the charging of the cells. However, when the first cell reaches full charge then any cell which started at a lower state of charge will never be fully charged and the battery can never reach its maximum voltage level. Alternatively, recharging can be continued to overcharge the cells to bring all of them to full charge. In this way charge balancing is achieved with lead-acid batteries, the overcharging ensuring that every cell is fully charged. However, this is not possible with some types of battery as the cells would be damaged and the battery ruined. For example, in the lithium-aluminium-/iron sulphide cell, overcharging leads to the formation of iron halide complexes at the positive electrode which eventually leads to irremedial damage. Furthermore, over-discharge of a battery brings about the anodic dissolution of the aluminium in the negative electrodes, irretrievably damaging the electrodes.

If battery cells are connected electrically in parallel the problem does not arise as the cells will settle to approximately equal charge levels giving approximately equal voltages and the battery can operate effectively.

Charge balancing is necessary to smooth the operation of the battery by equalising the charge of all of the cells. It is also necessary in order to avoid problems during the start up of the battery from different discharges of the separate cells.

Present solutions require each cell to be charged separately to achieve balanced charging and avoid over-charging or discharging of the cells. The individual cells are monitored and the charging carried out under computer control to ensure that all the cells have equal charges. The battery must be specially constructed and sophisticated switching means are required to enable charging to be discontinued on those cells that become fully charged and to continue on those that are still not fully charged.

A particular type of rechargeable battery is that based on the electrochemical reaction between a negative electrode of a lithium-aluminium alloy and a positive electrode of iron sulphide. The invention is particularly concerned with this type of battery but is also applicable wherever similar reversible reactions occur. In one variation Lithium-Aluminium could be replaced by Lithium-Calcium. Alternatively lithium could be replaced by sodium, potassium, calcium or other alkali or alkaline earth metals which are sufficiently reactive. Additionally iron sulphide could be replaced by iron disulphide or nickel sulphide or certain transition metal sulphides or oxides.

The inventor has discovered that it is the presence of hydrogen in a lithium battery cell that causes it to self-discharge and leads to problems of out-of-balance charges. Although lithium batteries are made under the driest conditions possible it is practically impossible to ensure that all water is removed from the battery chemicals and thus there will always be some residual water. When the battery is started up this water reacts with the lithium to produce hydrogen. The cells become discharged to different degrees and therefore the resultant charges will be out of balance when recharged.

The object of the invention is to provide a rechargeable alkali or alkaline earth metal battery and a method of operation to enable the charge on the cells in the battery to be balanced. It is a further object of the invention to provide a battery and method by which each cell in the battery is similarly charged without the need to charge them separately and by which they can be maintained at a uniform state of charge.

The invention provides a rechargeable battery with a negative electrode composed at least partly of an alkali or alkaline earth metal wherein cells of the battery are connected so that they are in a common atmosphere and there is provided means by which hydrogen is removed from the cells characterised in that the battery further includes (a) means to monitor the charge on each cell;
(b) means by which hydrogen is added to the cells when the charges are detected as being out of balance so as to cause the cells to self-discharge; and
(c) means to recharge the cells when they have self discharged Conveniently each cell may be open to a common manifold to connect them all to a common atmosphere. Alternatively the connection means between the cells may be by pipes between each of the cells.

The aim of exposing all the cells to a common atmosphere is to ensure that the concentration of hydrogen in the atmosphere is the same for each cell. Hence, as the battery is started up and hydrogen is formed from the reaction of water with the lithium, each cell will discharge to zero charge and thus they will all recharge from a common base point. The cells all discharge to zero as when one cell is fully discharged the hydrogen that caused it to discharge is released and made available to discharge further cells.

In one arrangement hydrogen is provided in the common atmosphere. Even if no hydrogen is present, other imperfections may eventually cause the cells to become out of balance and thus require rebalancing. If the cells have been made as perfectly as possible there may be no hydrogen present, or insufficient to fully discharge one cell so that the hydrogen is not released to discharge further cells. If this is the case, the added hydrogen ensures that all the cells discharge and thus that recharging commences from zero charge on all the cells. Hydrogen may be added even to the system which can produce sufficient hydrogen itself in order to speed up the self-discharge process.

In one arrangement the cells are arranged in series as an open stack within a stainless steel enclosure. The cells are thus directly open to a common atmosphere.

When recharging of a battery is commenced the hydrogen must be removed from the atmosphere experienced by them or they will discharge again. The hydrogen can diffuse out through the stainless steel casing as the casing is hot from the operation of the cells before they discharged, and hot stainless steel is permeable to hydrogen gas. However, if the casing is evacuated so that there is a vacuum between the cells and the walls, the stainless steel walls will not heat up and so hydrogen cannot escape. In this case it is advantageous to include a small "hot box" connected to the cells and part of the casing around the cells but outside the vacuum area so that as the cells heat up during operation the "hot box" also heats up, allowing hydrogen to diffuse out.

Alternatively a metal hydride may be provided to absorb the hydrogen and hold it ready for re-use if the cells should become out of balance again. Heating the metal hydride will release the hydrogen back into the cells to discharge them all if necessary. Otherwise the hydrogen will be absorbed by the metal hydride and so will not affect the atmosphere to which the cells are exposed.

In an alternative arrangement, particularly suitable for casings around a vacuum or made of a material that is not permeable to hydrogen, the hydrogen may be pumped off. Preferably the cells are allowed to cool below the freezing point of the electrolyte before applying pumping to remove the gas. This avoids the risk of damage to the cell that can be caused by efflux of hydrogen from the molten electrolyte.

With a pumping system, it is then advantageous to take battery leads and other electrical connections through the pumping pipework. Thus the cells in a battery can be completely enclosed and sealed from the ambient atmosphere but electrical connections can still be made to other batteries or external connections.

If a number of batteries are being used, these are advantageously connected so that they see a common atmosphere. In this way it is possible to charge a number of batteries in series such that every cell is balanced.

Operation of cells or batteries connected in parallel can also be improved by connecting them to a common atmosphere. When cells or batteries are connected in parallel the charge balances between them approximately and they work effectively. However, if they experience the same atmosphere the charge balances more evenly between them and their performance can be optimised.

The invention further provides in a second aspect a method of charge balancing the cells in a rechargeable alkali or alkaline earth metal battery comprising the steps of:
(1) connecting all the cells so that they are in a common atmosphere;
(2) adding hydrogen gas to the cells such that they self-discharge;
(3) removing hydrogen from the cells; and
(4) recharging the cells.

The hydrogen may be removed before recharging commences or during the recharging operation.

This method can be used to discharge the cells before storage of the battery. Hydrogen is added to the cells to cause them all to self-discharge to zero so that they can be stored in a state of no charge and when the battery is required again the hydrogen is removed and the cells recharged.

The method may include the further step of monitoring the charge on each cell to detect if a cell becomes out of balance with respect to the other cells, prior to adding hydrogen to the cells when they are detected to be out of balance such that each cell self-discharges.

Conveniently the state of charge of the cells is monitored by measuring the voltage on each cell and hence the means for monitoring the charge may be a voltmeter which indicates the voltage on each cell.

The invention is useful even for "perfect" cells which have been manufactured with no water present in the chemicals, and hence no self-discharging problems due to internally produced hydrogen. No cell can be absolutely perfect and other imperfections can cause the cells to become out of balance after the battery has been cycled many times. The battery arrangement and method of operation of the invention enable the cells to be brought to a zero state of charge, by the addition of hydrogen, and then recharged from a common base point to ensure that the charges on all the cells are balanced once again.

In all the above aspects of the invention the means for recharging electrical cells may be any of those well known in the art. Hydrogen may be added to the cells from an outside source or may be stored within the battery system, for example in a metal hydride, and regenerated as required. The hydrogen may be removed from the cells by diffusion through the hot cell wall, by absorption into a metal hydride or other hydrogen absorbing chemical or may be pumped off.

The invention will now be described by way of example only with reference to the drawings of which:

Figure 1:
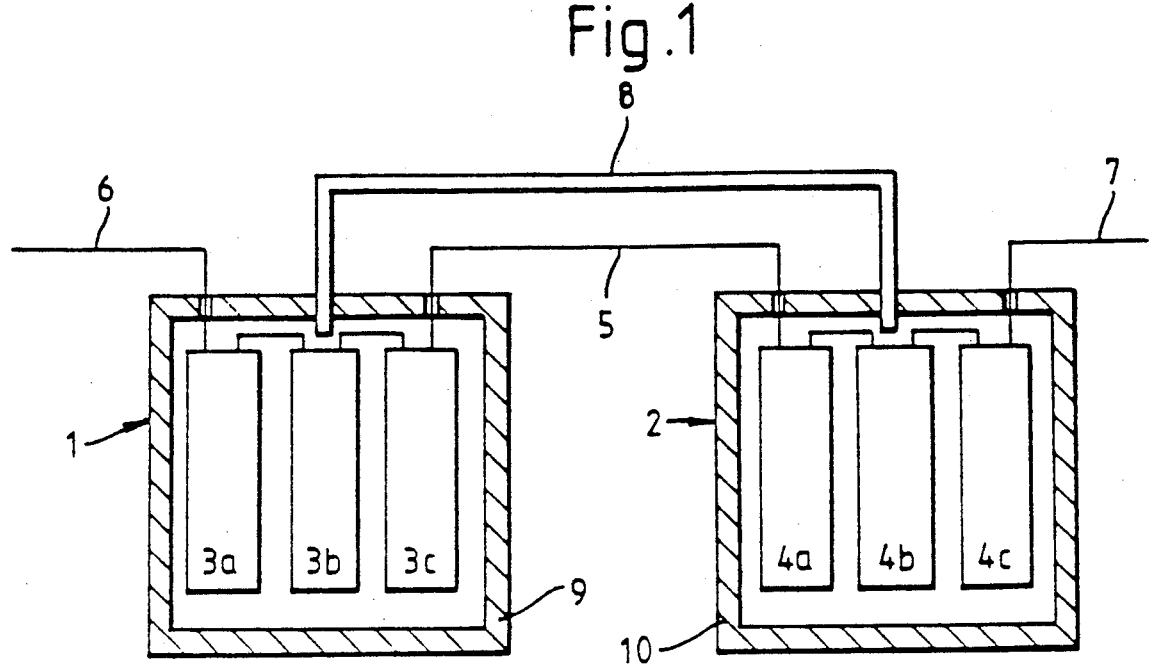
FIG. 1 shows, in cross-section, a simplified, schematic diagram of two lithium-aluminium/iron sulphide batteries connected in series.

FIG. 1 shows, in cross-section, a simplified, schematic diagram of two lithium-aluminium/iron sulphide batteries 1 and 2 connected in series. Each battery 1, 2 is shown containing stacks of three cells 3a,b,c, and 4a,b,c, open to the atmosphere within the respective batteries 1,2. The cells are connected in series with the negative terminal of cell 3c being connected by a connecting lead 5 to the positive terminal of cell 4a. An input 6 is connected to the positive terminal of cell 3a and an output 7 is connected to the negative terminal of cell 4c. The input 6 and output 7 may be connected to further batteries or a power supply input for recharging or an output for the batteries 1, 2 provide the power source (none shown).

A connecting pipe 8 is fitted between the two batteries 1 and 2 to allow distribution of gases between the batteries so that each cell sees a common atmosphere. If further batteries are connected in series (not shown), connecting pipes are fitted between one battery and the next to allow all of them to see the same atmosphere.

The overall electrochemical reaction of the cells can be represented by the following equation:

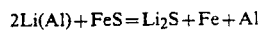
$$2Li(Al) + FeS = Li_2S + Fe + Al$$

Electrolyte is neither consumed nor generated in the reaction.

If recharging of the cells 3, 4 is commenced any water present reacts with the lithium in the cells to produce hydrogen gas. The hydrogen acts as a "shuttle" for transporting lithium from the negative to the positive electrode. The reaction scheme can be written as follows:

$$2Li + H_2 \rightarrow 2LiH_{solution} \rightarrow 2LiH + FeS \rightarrow Li_2S + Fe + H$$

The liberated hydrogen reacts still further with more lithium and the process eventually completely discharges the cell. The products in both electrodes are the same as from the electrochemical discharge reaction and so can be reversed by a normal recharge process. The hydrogen is distributed between the batteries 1 and 2 via the pipe 8. The hydrogen causes the cells 3, 4 to discharge completely so that their resultant charge is zero. Once the cells have discharged they begin to recharge again. The walls, 9 and 10, of the batteries 1, 2 are made of stainless steel and as they become hot from the operation of the batteries the hydrogen can diffuse out, enabling the cells to be fully recharged for effective operation of the batteries.

Figure 2:
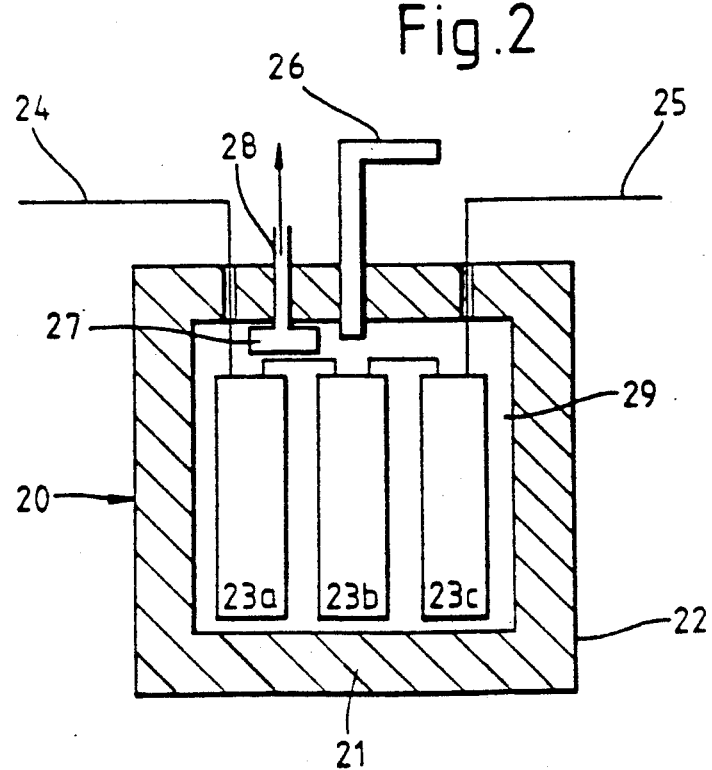
FIG. 2 shows, in cross-section, a simplified, schematic diagram of an evacuated lithium-aluminium/iron sulphide battery showing a "hot box" to enable hydrogen to diffuse out of the battery casing.

FIG. 2 shows an arrangement by which hydrogen can diffuse out of a battery 20 having an evacuated casing 21 such that the battery walls 22 are prevented from heating up and thus never become permeable to hydrogen.

As in batteries 1 and 2 shown in FIG. 1, the battery 20 contains a stack of cells 23a,b,c which are connected together in series. An electrical input 24 and output 25 are connected to further batteries, power supplies etc as required (none shown). A pipe 26 connects the battery 20 to any other batteries in the system (not shown) or is blocked off if no other batteries are connected. The cells 23a,b,c are in a common atmosphere within the container 29 and the pipe 26 enables all connected batteries to experience the same atmosphere. Hydrogen thus distributes between the cells 23a,b,c, and the cells in further batteries, and causes them all to self-discharge to zero. The cells are then recharged. However, unlike the batteries 1,2 of FIG. 1, the cell walls of the battery do not heat up during operation of the battery because of the vacuum within the casing 21. Hence, "hot box" 27 is enclosed within the container 29. This box 27 is made of stainless steel and as the cells heat up during operation of the battery the box 27 is heated up as well, becoming permeable to hydrogen. The hydrogen can then diffuse out through the stainless steel wall of the box 27 and pass out of the battery 20 through pipe 28.

The invention has the advantage that it enables lithium cells, and hence batteries, to be charged in series whereas previously each cell had to be charged separately. The invention also avoids the need for the sophisticated monitoring systems that were necessary with prior art methods and means of charging lithium batteries.

Sharing a common atmosphere ensures that the cells are in balance almost immediately from the moment of activation and remain so for many cycles.

If at any time the cells become unbalanced during operation they can be simply and easily rebalanced by the deliberate addition of hydrogen to discharge them totally so they can then be recharge from zero state of charge. The hydrogen can be added from an external source or can be stored within the battery ready for use, for example in a metal hydride, the hydrogen being generated or reabsorbed by control of the temperature of the metal hydride.

The invention is not limited to Lithium Aluminium/Iron sulphide batteries but can be used wherever similar reversible reactions to those discussed between lithium and hydrogen and lithium hydride and iron sulphide occur.

We claim:

1. A rechargeable battery with a negative electrode composed at least partly of an alkali or alkaline earth metal wherein cells of the battery are connected so that they are in a common atmosphere and there is provided means by which hydrogen is removed from the cells characterised in that the battery further includes
   (a) means to monitor the charge on each cell;
   (b) means by which hydrogen is added to the cells when the charges are detected as being out of balance so as to cause the cells to self-discharge; and
   (c) means to recharge the cells when they self discharged.

2. A rechargeable battery according to claim 1 characterised in that the cells are arranged in series as an open stack within a stainless steel enclosure.

3. A method of charge balancing the cells in a battery having a negative electrode composed at least partly of an alkali or alkaline earth metal comprising the steps of:
   (1) connecting all the cells so that they are in a common atmosphere;
   (2) adding hydrogen gas to the cells such that they self-discharge;
   (3) removing hydrogen from the cells; and
   (4) recharging the cells.

4. A method of charge balancing the cells in a battery according to claim 3 characterised in that the hydrogen is removed before recharging commences or during the recharging operation.

5. A method of charge balancing the cells in a battery according to claim 3 or claim 4 characterised in that the method includes the further step of monitoring the charge on each cell to detect if a cell becomes out of balance with respect to the other cells, prior to adding hydrogen to the cells when they are detected to be out of balance such that each cell self-discharges.

6. A method of charge balancing the cells in a battery according to claim 5 characterised in that the state of charge of the cells is monitored by measuring the voltatge on each cell.

* * * * *